United States Patent
Tawfick et al.

(10) Patent No.: US 9,015,154 B2
(45) Date of Patent: Apr. 21, 2015

(54) PART NUMBER SEARCH METHOD AND SYSTEM

(71) Applicant: WayPart, Inc., San Francisco, CA (US)

(72) Inventors: Hisham Said Tawfick, Alexandra (EG); Mohamed Sherif Danish, Cupertino, CA (US)

(73) Assignee: WayPart, Inc., San Francisco, CA (US)

( * ) Notice: Subject to any disclaimer, the term of this patent is extended or adjusted under 35 U.S.C. 154(b) by 0 days.

(21) Appl. No.: 14/295,257

(22) Filed: Jun. 3, 2014

(65) Prior Publication Data
US 2014/0289233 A1    Sep. 25, 2014

Related U.S. Application Data

(63) Continuation of application No. 13/353,275, filed on Jan. 18, 2012, now Pat. No. 8,751,488.

(60) Provisional application No. 61/527,043, filed on Aug. 24, 2011.

(51) Int. Cl.
   *G06F 7/00* (2006.01)
   *G06F 17/30* (2006.01)

(52) U.S. Cl.
   CPC ...... *G06F 17/3053* (2013.01); *G06F 17/30477* (2013.01)

(58) Field of Classification Search
   CPC .......... G06F 17/3053; G06F 17/30477; G06F 17/30398; G06F 17/30864; G06Q 30/06; G06Q 10/0875
   USPC ........ 707/708, 722, 723, 748, 749, 755, 758, 707/780
   See application file for complete search history.

(56) References Cited

U.S. PATENT DOCUMENTS

| | | | |
|---|---|---|---|
| 6,871,198 B2 * | 3/2005 | Neal et al. | 1/1 |
| 8,126,913 B2 * | 2/2012 | Catucci et al. | 707/780 |
| 8,161,045 B2 * | 4/2012 | Arnold et al. | 707/736 |
| 2004/0167833 A1 * | 8/2004 | Schickler | 705/28 |
| 2005/0125261 A1 * | 6/2005 | Adegan | 705/4 |

* cited by examiner

*Primary Examiner* — Md. I Uddin
(74) *Attorney, Agent, or Firm* — Donald L. Bartels; Bartels Law Group

(57) ABSTRACT

A computer implemented method and system for identifying one or more part numbers stored in a digital memory comprises parsing of each part number into its primary and secondary components and assigning a relevance score to each; parsing a query part number into one or more primary and secondary components and assigning a relevance score to each query component; identifying each stored part number that has at least one component that matches a query component; calculating for each identified part number a first sum equal to the sum of the relevance scores of the query components that match a component of the identified stored part number; and a second sum equal to the sum of the relevance scores of the components of the identified stored part number that match a query component; and sorting the identified stored part numbers as a function of said first and second sums.

17 Claims, 5 Drawing Sheets

PART NUMBER SEARCH METHOD AND SYSTEM

CROSS REFERENCE TO RELATED APPLICATION

This application claims the benefit of U.S. Provisional Application No. 61/527,043 filed Aug. 24, 2011, entitled "PART NUMBER SEARCH METHOD AND SYSTEM" the entirety of which is incorporated herein by reference. This application also claims the benefit of U.S. patent application Ser. No. 13/353,275, filed Jan. 18, 2012, now U.S. Pat. No. 8,751,488 issued Jun. 10, 2014, the entirety of which is incorporated herein by reference.

BACKGROUND OF THE INVENTION

The increased capacity of digital memory storage, both locally on a computer and remotely over networks, such as the internet, to remote electronic data storage, offers users access to large amounts of data in a very convenient form and physical size. Data may be available on diskette, CD-ROM, magnetic tape, and online to a centrally located computer/server and memory storage medium. The challenge remains to extract information from the data simply and efficiently, and to have confidence that all relevant items have been uncovered. The widespread use of computers and electronic searching has attracted the attention of large manufacturers offering a vast array of products in an increasingly competitive environment. In an effort to offer products that closely matches customer needs, manufacturers proliferate product and product feature alternatives, and create different product model numbers or part numbers for these alternative products. This proliferation of product offerings provides the customer with more options from which to choose, however, it also increases the difficulty of finding a product that matches a specific customer's needs.

Computer implemented searching of a database of part numbers, model numbers, etc. stored in a digital memory, to determine if there is a match with a part number of interest, is difficult when the part numbers are stored in a format that is different from the part number the user is searching for, which is often the case. There can be any number of reasons for this discrepancy, including but not limited to the following examples:

1. A manufacturer uses the number 12345 for a part number, and 12345R for the refurbished version of the part number. If the user enters the query part number 12345 and the only stored part number is 12345R, there will be no match. The user, however, might be satisfied with the refurbished version 12345R.
2. A manufacturer uses 12345 for a part number, and 12345W for a version of the part number that is white. If the stored part number is 12345 and the user enters 12345W there will be no match.
3. An equipment manufacturer uses part number 12345 of a component manufacturer in particular equipment, and sells this part as a spare part under the number AB12345, where AB represents the abbreviation of the equipment manufacturer name or the component manufacturer's name. If the user enters AB12345 and the stored part number is 12345 there will be no match.
4. The manufacturer B of a component that is equivalent in form/fit/function to the component number 12345 made by manufacturer A might give the equivalent part number the code 12345B.
5. The distributor of the part 12345 made by manufacturer A might assign the part number DS12345 to the part.
6. Sometimes, a distributor of a part adds a couple of digits before or after the part number. For example, part number 12345 might be stored as 9012345 or 1234590.

In one embodiment, what is needed is a search method and system that enables stored part numbers in a database to be retrieved even though the stored part number is not exactly the same as the query part number provided by a user, and wherein the retrieved stored part number or numbers are sorted by various criteria so that it is more likely that the most relevant stored part number or numbers are displayed to the user in a descending order of relevance.

SUMMARY OF THE INVENTION

Broadly stated, in one embodiment, the invention is a computer implemented method for identifying one or more part numbers in a list of part numbers stored in a digital memory comprising: parsing each part number into one or more primary components and secondary components based on a first predetermined set of rules and calculating a relevance score for each component of each said stored part number; receiving a query part number from the user and parsing it into one or more query primary components and query secondary components based on said first predetermined set of rules and calculating a relevance score for each query component of said query part number; identifying each stored part number that has at least one component that matches a query component of said query part number; calculating for each identified stored part number: a) a first sum equal to the sum of the relevance scores of the one or more query components of the query part number that match a component of the identified stored part number; and b) a second sum equal to the sum of the relevance scores of the one or more components of the identified stored part number that match a query component; sorting the identified stored part numbers in a predetermined numerical order as a function of said first sum; and sorting the identified part numbers in a predetermined numerical order as a function of said second sum for any part numbers whose first sums are the same.

In another embodiment, the invention further includes calculating for each identified part number a third sum equal to the number of matched components in the identified part number, and sorting the identified stored part numbers in a predetermined numerical order as a function of said third sum for any identified stored part numbers whose first and second sums are the same.

In another embodiment, the invention further includes multiplying each of said first and second sums by a correction number to remove less significant variations between such sums before the identified stored part numbers are sorted.

In another embodiment, the invention further includes calculating for each identified stored part number a number which is a function of the order of the matched components in each identified part number, and sorting the identified part numbers in ascending numerical order as a function of said number for any identified stored part numbers whose first and second sums are the same.

In another embodiment, the invention further includes enabling the display of the sorted identified part numbers on a user's computer.

In yet another embodiment, the invention further includes: parsing each query part number to identify any key words that describe the part associated with each part number; parsing each part number stored in said database to identify any keywords that describe the part associated with that part number; calculating a relevance score for each descriptive keyword and sorting the identified stored part numbers as a function of any keyword matched between said query part number and any identified stored part number.

In another embodiment, a computer-implemented system for performing part number searches according to the invention comprises a digital memory having a database of part numbers stored therein; a data processor configured to parse each stored part number into one or more primary components and secondary components based on a first predetermined set of rules; to calculate a relevance score for each component of each said stored part number; and to store each said relevance score in said digital memory; a user interface for enabling a user to input a query part number, said user interface configured to parse said query part number into one or more query primary components and query secondary components based on said first predetermined set of rules; to calculate a relevance score for each query component of said query part number; and to store each said relevance score in said digital memory; said data processor further configured to identify each stored part number that has at least one component that matches a stored query component of said query part number; and said user interface further configured for enabling the displaying to the user of the one or more identified stored part numbers in descending numerical order as a function of a first sum equal to the sum of the relevance scores of the one or more query components of the query part number that match a component of the identified stored part number; and for enabling the display to the user of the one or more stored part numbers in descending numerical order as a function of a second sum equal to the sum of the relevance scores of the one or more components of the identified stored part number that match a query component for any identified stored part numbers whose first sums are the same.

In one embodiment, an object of the invention is to enable a user to input a query part number and find a potentially relevant part number stored in a digital memory database even if only a portion of the stored part number matches some or all of the alphanumeric characters in the query part number. In another embodiment, an object of the invention is to enable a user to find a potentially relevant part number stored in a digital memory database even if the alphanumeric characters of the part number are in a different order than in the query part number.

In one embodiment, after one or more stored part numbers are identified as having a component that matches a query part number, the identified stored part numbers are first sorted in descending order based on a first sum calculated for each identified stored part number that is equal to the sum of the relevance scores of the one or more query primary, secondary, and composite components of the query part number that match a primary, secondary, or composite component of the identified stored part number; then sorted in descending order based on a second sum equal to the sum of the relevance scores of the one or more components of the identified stored part number that match a query component for any identified stored part numbers having the same first sum; then sorted in ascending order of a third sum equal to the absolute value of the difference between an assigned position number of a component in the query component an assigned position number of a matching component in an identified part number for any identified stored part numbers having the same first and second sum; and then sorting in descending order based on the number of matched components in the identified stored part number for any stored part number whose first, second, and third sums are equal.

BRIEF DESCRIPTION OF THE DRAWINGS

The features, advantages, and benefits of the present invention will become more apparent from the following description read in conjunction with the accompanying drawings, in which like reference numerals designate the same elements, and which are presented solely for exemplary purposes and not with the intent to limit the invention thereto, and in which.

DETAILED DESCRIPTION OF THE INVENTION

A part number (also called a product number) is a sequence of alphanumeric characters that may include special characters like spaces, hyphens, dots, slashes, tabs, and brackets. Examples of part numbers include: ABC123-567XYZ and 75FB231.

A part number consists of one or more primary components. In one embodiment of the invention, primary components of a part number are identified according to the following rules: 1) primary components include any contiguous set of alphabet letters; and 2) primary components include any contiguous set of numbers. In the above-mentioned exemplary part number ABC123-567XYZ, the primary components are ABC, XYZ, 123 and 567. In exemplary part number 75FB231, the primary components are FB, 75, and 231.

Figure 1A:
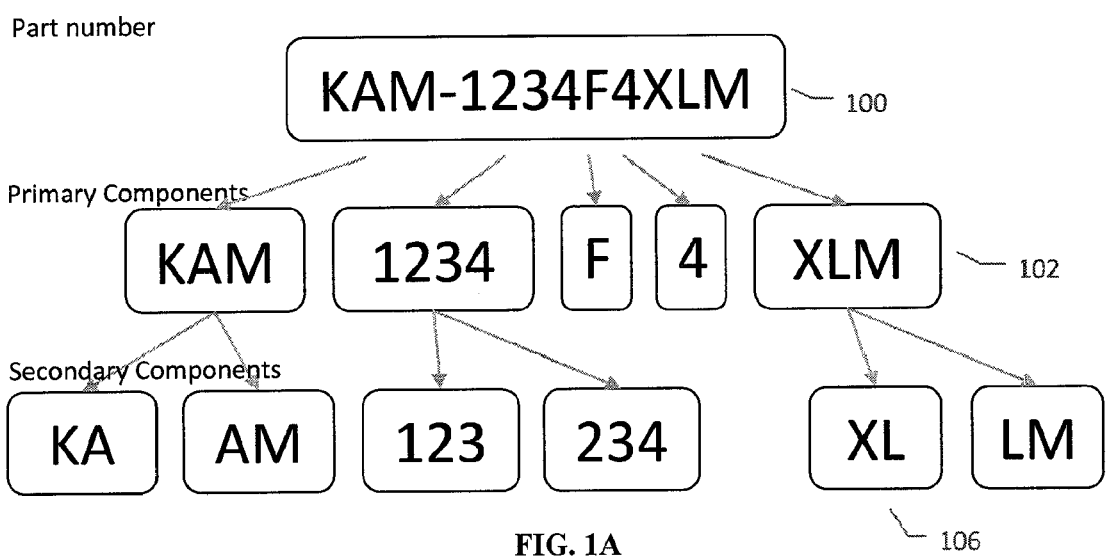
Figure 2A:
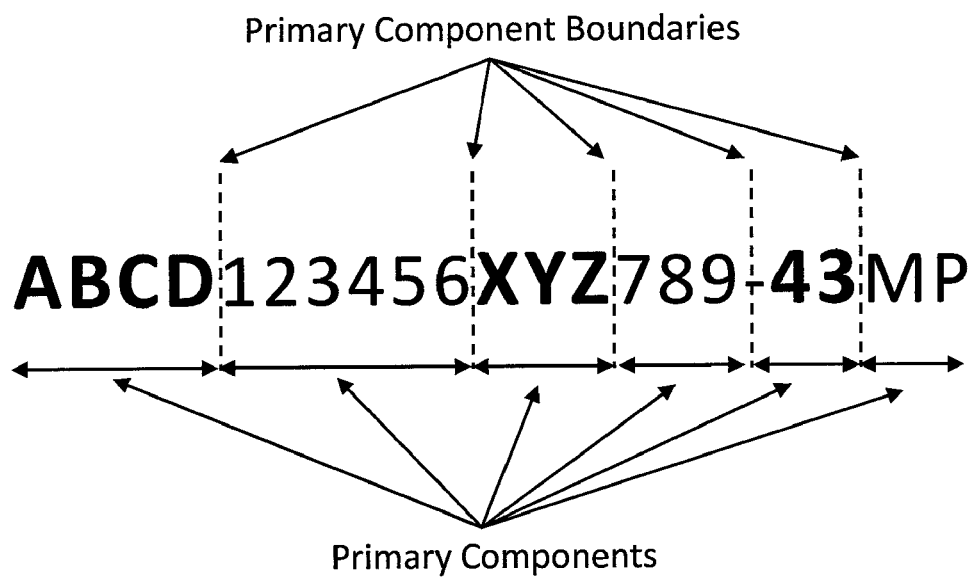
FIG. 2A is a diagram showing the parsing of a second exemplary part number into primary components and FIG. 2B is a diagram showing an alternative way of calculating the relevance score of each primary and secondary component of an exemplary part number according to one embodiment of the invention.

According to one embodiment of the invention, primary components can't include any special characters like: spaces, hyphens, dots, slashes, brackets, tabs, etc. These separators break primary components. For example, in 123-567, there are two primary components separated by a hyphen "-". The primary components are 123 and 567. FIGS. 1A and 2A illustrate two examples of how a part number may be parsed into a series of primary components. As seen in FIG. 2A, primary component boundaries may be determined by a shift from an alphabetic character to a numeric character or vice versa, or by special characters, such as a hyphen.

According to one embodiment of the invention, a part number also typically includes secondary components. A part number like 0041234 has one primary component "0041234" according to the above definition of primary components. However, the part number might actually consist of two components: "004" a number that identifies the manufacturer, and "1234" a number that identifies the part. The user might want to enter 1234 to find the part independently of which manufacturer makes it. In another example, part 1234501 might actually consist of two components: "12345" to identify the part, and "01" to denote a variation like the color. The user might want to enter 12345 to find the part independently of the color. Therefore, there is a need to define secondary components.

A primary component consists of zero or more secondary components. A secondary component may be the relevant portion of the primary component that identifies the part. Identifying the secondary components of certain primary components is dependent on the nature of the primary components, the way primary components are generated, and the information captured in the primary component itself. In other words, a secondary component is a function of the primary component and may be based on the type of the primary component or even the content of the primary component itself In one embodiment of the invention, a secondary component of a primary component is generated by omitting one or more leading or trailing characters from the primary component. In this embodiment, the following rules are used:

1) A secondary component is a subset of the primary component where one or more leading or trailing characters are omitted;

2) The number of secondary components contained in a given primary component varies according to the primary component's length;

3) A primary component of 3 or 4 characters has only 2 secondary components generated by omitting a single character from the primary component (Examples include: a) a primary component 123 has the secondary components 23 and 12; and b) a primary component 4567 has the secondary components 456 and 567); and 4) A primary component of 5 or 6 characters has only 4 secondary components generated by omitting either one or two characters from the leading and trailing ends of the primary component (Examples include: a) primary component 12345 has the secondary components 1234, 2345, 123 and 345; and b) primary component 123456 has the secondary components: 12345, 23456, 1234 and 3456).

The following table lists, in one embodiment, the number of secondary components generated as a function of the primary component's length:

| Primary Component Length | Leading or Trailing Characters to omit | Number of secondary components |
|---|---|---|
| 1-2 | 0 | 0 |
| 3-4 | 1 | 2 |
| 5-6 | 2 | 4 |
| 7-8 | 3 | 6 |
| 9-12 | 4 | 8 |
| 13+ | 5 | 10 |

Referring again to FIG. 1, FIG. 1A is a diagram showing the parsing of exemplary part number KAM-123F4XLM, shown at (100), into primary components and secondary components according to one embodiment of the invention. As seen in FIG. 1A, part number (100) is parsed into primary components (102). Each of the primary components (102) that have a primary component length of more than two is parsed according to the above described rules into a plurality of secondary components (106).

The term "relevance score" (RS) is a numerical score defined to measure how relevant a primary or secondary component is to the original part number. According to one embodiment of the invention, the higher the relevance score, the more relevant the component is to the part number.

In one embodiment, the relevance score RS obeys the following rules:

1) Primary components always have a higher relevance score than secondary components;

2) Numeric primary components have a higher relevance score than alphabetic primary components;

3) Long components have a higher relevance score than shorter components of the same type;

4) Numeric secondary components generated by omitting trailing digits have a higher relevance score than numeric secondary components generated by omitting leading digits; and 5) Secondary components (both numeric and alphabetic) generated by omitting fewer characters have a higher relevance score than secondary components generated by omitting more characters.

In one embodiment, utilizing the above listed rules 1-5, relevance scores for each component in a part number are calculated as follows. First, a first number, called Character Factor $CF_a$, is assigned to alphabetic characters and a second number, called Character Factor $CF_n$, is assigned to numeric characters. These Character Factors are used to mathematically weight the importance of numeric characters higher than alphabetic characters in a part number. This is because, typically, numbers are more important than letters in a part number. Consequently, in one embodiment, $CF_n$ is a larger number than $CF_a$. In one embodiment, $CF_a=1$ and $CF_n=2$. Second, these Character Factors are applied to each character in the part number and these numbers are summed to create a Sum of the Character Factors (SCF). For example, in part number ABC789, the Sum of Character Factors (SCF) would be =1 (for the A)+1 (for the B)+1 (for the C)+2 (for the 7)+2 (for the 8)+2 (for the 9)=9. Third, an Average Character Weight (ACW) is calculated. In one embodiment, ACW=C/SCF, where C is a predetermined constant. In this exemplary embodiment, C is equal to 10,000. For the above exemplary part number ABC789, the Average Character Weight is therefore calculated as follows: ACW=10000/9=1111.11.

Using the calculated values obtained for $CF_a$, $CF_n$, and ACW, described above, the Relevance Score (RS) of each primary and secondary component in a part number is then calculated in one embodiment as follows:

a) RS(primary numeric component)=length of component*ACW*$CF_n$. In the example of part number ABC789, the Relevance Score RS of the numeric primary component 789 is calculated as follows: 3*1111.11*2=6666.66.

b) RS(primary alphabetic component)=length of component*ACW*$CF_a$. In the example of part ABC789, the Relevance Score of the alphabetic component ABC is calculated as follows: 3*1111.11*1=3333.33.

c) RS(secondary numeric component where trailing characters are omitted)=(Length of secondary component/length of parent primary component)*RS(parent primary component)*TCNSCF, where TCNSCF is a decreasing factor for the numeric secondary components generated by omitting trailing characters. In one embodiment, TCNSCF=1. In the example of part number ABC789, the secondary numeric component of the parent primary component 789 where trailing characters are omitted is 78. The Relevance Score RS for this secondary component is therefore calculated as follows: (2/3)*6666.66*1=4444.44.

d) RS(secondary numeric component where leading characters are omitted)=(Length of secondary component/length of parent primary component)*RS(parent primary component)*LCNSCF, where LCNSCF is a decreasing factor for the numeric secondary components generated by omitting leading characters. In one embodiment, LCNSCF=0.5. In the example of part number ABC789, The RS of the secondary numeric component of the parent 789 where leading characters are omitted (component 89) is therefore calculated as follows: (2/3)*6666.66*0.5=2222.22. As can be seen from this example, since LCNSCF=0.5 and TCNSCF=1, this creates a higher relevance score for secondary components where trailing digits have been omitted as compared to secondary components where leading digits have been omitted.

e) RS(alphabet secondary components)=(Length of secondary component/length of parent primary component)*RS (parent primary component)*ASCF, where ASCF is a decreasing factor for the alphabet secondary components. In one embodiment, ASCF=0.5. In the example of part number ABC789, the secondary component of the parent ABC are AB and BC. The RS for each of these secondary components is therefore calculated as follows:
(2/3)*3333.33*0.5=1111.11.

In one embodiment, the relevance score of each primary and secondary component of each part number in the database is calculated using the formulas described above and these numbers are then stored in a digital memory. In the same way [H1], In one embodiment, the relevance score of each primary and secondary component of the query part number is calculated when the query part number is entered by a user. In an alternate embodiment, different relevance scoring functions and constants can be used in determining the relevance scores of the components of the query part number.

Figure 2B:
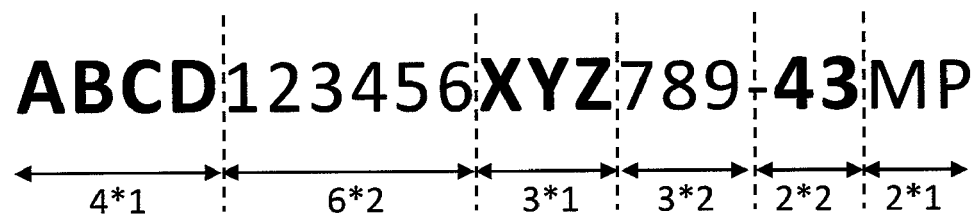

FIG. 2B is a diagram showing an alternative way of calculating the relevance score of each primary and secondary component of an exemplary part number according to another embodiment of the invention. FIG. 2B is a diagram showing the primary components of an exemplary part number and their weight (WPC). As seen in FIG. 2B, the weight of a primary component (WPC) is equal to the number of characters of the component multiplied by a weight factor WF. In one embodiment, the Weight Factor WFn for numeric components is [H2] higher than the factor of alphabetic components WFa. In an alternate embodiment, in certain industries, the alphabet characters may be more important than numeric characters, and so the weight factor for alphabet characters in that embodiment may be higher than for numeric characters.

In one preferred embodiment, WFn=2, and WFa=1. In the example shown in FIG. 2B, using these weight factors, the sum of the weights of the primary components SUM(WPCi) is: SUM(WPCi)=4*1+6*2+3*1+3*2+2*2+2*1=4+12+3+6+4+2=31. The weight of each character (WEC) is equal to a Relevance Constant (RC) divided by SUM(WPCi), i.e., WEC=RC/SUM(WPCi). In this example, assuming RC=10,000 in a preferred embodiment, then: WEC=10,000/31=322.58. The relevance of a numeric primary component (RPCn) is: RPCn=Number of primary component characters*Weight Factor (WFn)*Weight of Each Char. (WEC). The relevance of an alphabetic primary component (RPCa) is: RPCa=Number of primary component characters*Weight Factor (WFa)*Weight of Each Char. (WEC). In this example, the RPC of the primary components is as follows:
RPC(ABCD)=4*1*322.58=1290.32
RPC(123456)=6*2*322.58=3870.96
RPC(XYZ)=3*1*322.58=967.74
RPC(789)=3*2*322.58=1935.48
RPC(43)=2*2*322.58=1290.32
RPC(MP)=2*1*322.58=645.16

The relevance of a numeric secondary component generated by omitting trailing characters (RSCnt) is: RSCnt=(Number of secondary component characters/Number of parent primary component characters)*RPC of parent. The relevance of any alphabetic secondary component and for numeric secondary components generated by omitting leading characters is: RSCanl=(Number of secondary component char./(WFn*Number of parent primary component characters))*RPC of parent. In the example shown in FIG. 2B, the secondary components include ABC, VCD, 12345, 23456, 1234, 3456, XY, YZ, 78 and 89. The relevance scores RPC of some of the secondary components are as follows:
RPC(12345)=(5/6)*3870.96=3225.8
RPC(ABC)=(3/(4*2))*1290.32=483.87
RPC(BCD)=(3/(4*2))*1290.32=483.87
RPC(23456)=(5/(6*2))*3870.96=1612.9

Figure 3:
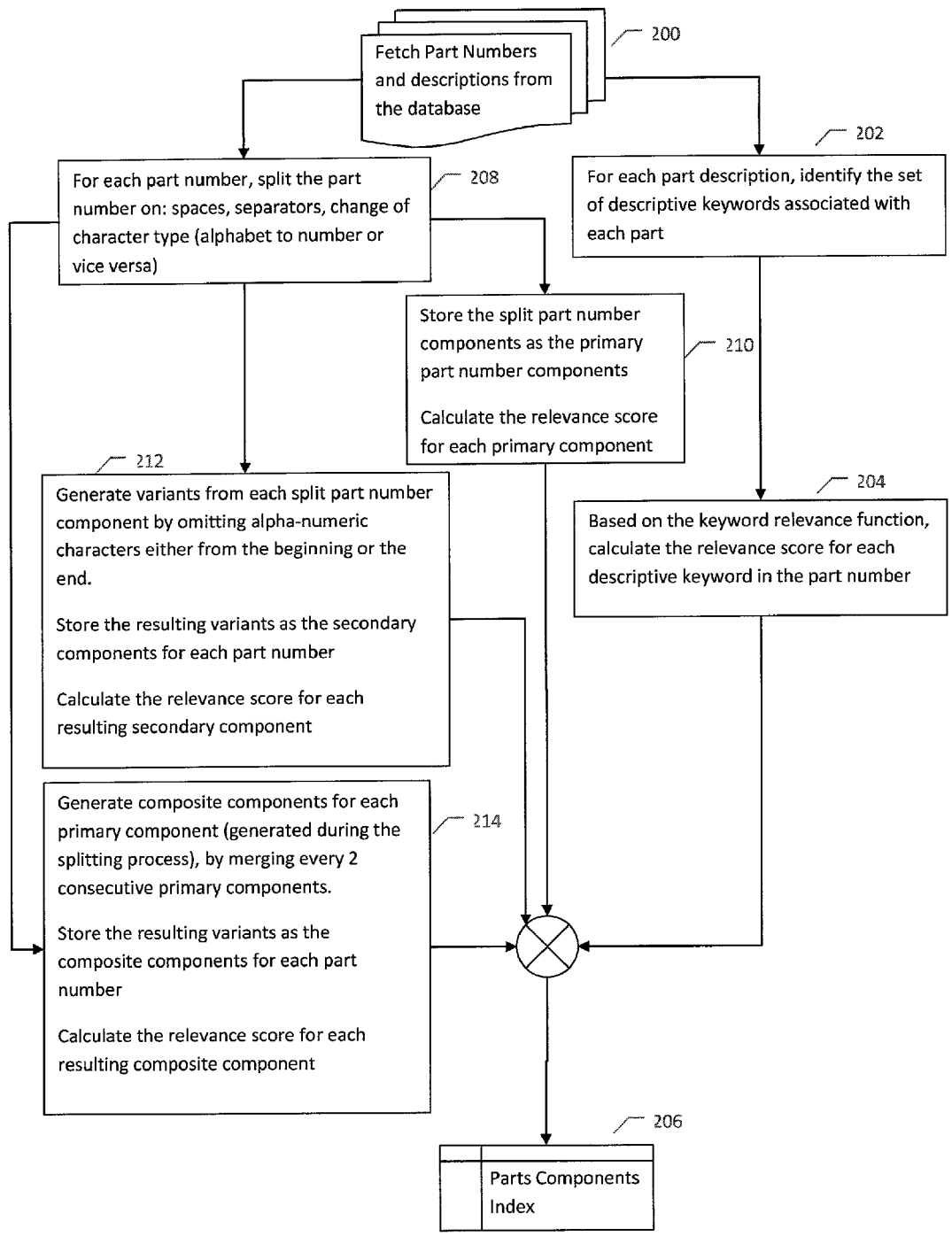
FIG. 3 is a flowchart showing a computer implemented method for indexing part numbers and descriptions according to one embodiment of the invention.

Once a particular method has been selected for calculating the relevance scores for each of the components in a stored part number, the next step in the method according to one embodiment of the invention is to build an index of all the stored part numbers in the database by calculating and storing relevance scores for each of the components found in each stored part number. FIG. 3 is a flowchart showing a process for indexing stored part numbers and descriptions according to one embodiment of the invention. As seen in FIG. 3, each of the part numbers are fetched (200) and parsed into part numbers and part descriptions. The part numbers are parsed into their primary components (208) and stored (210). The secondary components are generated and stored. The relevance scores of each primary and secondary component is calculated (210, 212). In an alternate embodiment, the primary components of each part number are also combined into zero or more composite components and stored, and the relevance scores of each composite component is calculated (214). Similarly, in an alternate embodiment, any descriptive keywords in each stored part number is identified and stored and a relevance score is calculated for each descriptive keyword (202, 204). The generation of composite components of the part number (214) are described in more detail below, as well as the identification and analysis of part description key words (202, 204).

With the data obtained from the above steps, a computer accessible parts component index (206) database is created. In one embodiment of this index database, all of the primary, secondary, and composite components of each stored part number are stored along with the relevance score of each component.

Figure 4:
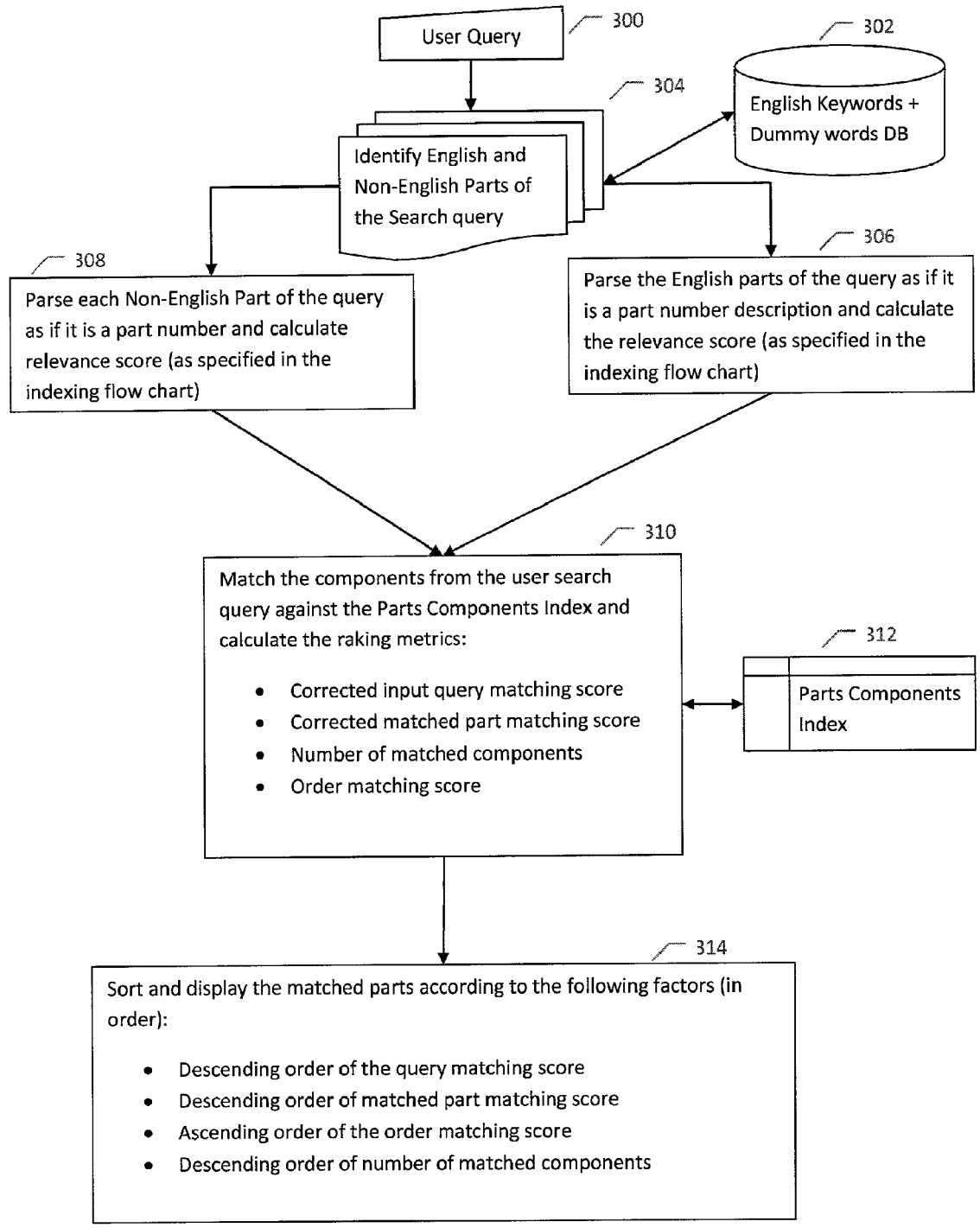
FIG. 4 is a flowchart showing a computer implemented method for processing a user's part number query according to one embodiment of the invention.

FIG. 4 is a flowchart showing a method for processing a user's part number query according to one embodiment of the invention. As seen in FIG. 4, a part number is input as a query from a user (300). This query part number is preferably parsed into its English descriptive keywords (if any) and its alphanumeric parts (304). The alphanumeric parts of the query part number are then parsed into their primary and secondary components and the relevance score of each component is calculated (308) in the same manner that part numbers in the parts components index are created, as shown in the flowchart of FIG. 3. In an alternate embodiment, composite components of the query part number are also identified and the relevance score of each calculated. In an alternate embodiment, different relevance functions and constants may be applied than those used during the processing of stored part numbers.

Referring again to FIG. 4, using the parts components index database (312) (identified as 206 in FIG. 3), all of the stored part numbers in the index database which contain any of the primary or secondary components that match any primary or secondary component of the input query part number are identified. In one embodiment of the invention, for each matched stored part number, the following ranking metrics are calculated (310):

1) Input query part number matching score, a first sum equal to the sum of the relevance scores of the components in the query part number where a match has been found with a component in the identified stored part number.

2) Matched part matching score, a second sum equal to the sum of the relevance scores of the one or more components in the identified stored part number that match a query component.

3) A third sum equal to the number of components in the input query part number and the identified stored part number that match.

4) In one embodiment, the identified stored part numbers are sorted as follows (314):
   a) Level 1: In descending order of the input query matching score calculated in 1) above.
   b) Level 2: In descending order of matched part matching score calculated in 2) above for any stored part numbers having the same query matching score sum.
   c) Level 3: In descending order of number of matched components calculated in 3) above for any stored part numbers having the same query matching score and the same matched part number matching score.

In one embodiment, the identified part numbers are sorted as described in Levels 1 and 2 above, according to "corrected" values of input-query/matched part matching scores, respectively. In one embodiment, a correction function is applied to each of the first and second sums to remove less significant variations between such sums before the sorting of said identified stored part numbers as a function of said first and second sums. One way of implementing this correction function is to multiply the values of the matching scores by a predetermined correction number to remove less significant variations between such sums before the sorting of said identified stored part numbers as a function of said first and second sums. The reason behind the use of a correction function is to allow for the modification of matching scores based on the actual numbers of the matched part numbers and to fix any anomalies in the Relevance Functions.

For example, consider the case where two matching part numbers give input query matching scores of 2003 and 2002, respectively, while they give matched part matching scores of 100 and 8100. If we sort according original input-query matching score and then the matched part matching score, it is clear that the first part number will be listed before the second part number. However, it seems like the second part number is a better match for the input query than the first part number, since it has a matched part matching score that is so much higher.

In one embodiment, an Input query relevance correction function IQRCF(rs), a numerical function, is applied to the set of input-query matching scores to generate a corrected input query matching score. A matched parts relevance correction function MPRCF(rs), a numerical function, is similarly applied to the set of matched part matching scores to generate a corrected matched part matching score.

In one embodiment, the correction function is defined as: 1/(maximum [matching score]*a tolerance factor), where the tolerance factor is a percentage of how much to tolerate the difference between two different scores. Consequently, an input query relevance correction factor=1/(maximum [input query matching score (3-a)]*input query relevance tolerance factor (IQRTF)). Similarly, a matched parts relevance correction factor=1/(maximum [matched part matching score (3-b)] *matched parts relevance tolerance factor (MPRTF)).

Returning to the above example, and putting IQRTF and MPRTF=0.01 (1% tolerance) the following corrected values are calculated. The maximum input query matching score=2003, and so IQRTF=1/(2003*0.01)=0.0499. This results in a Corrected input query matching score of part 1=2003*0.04993=100 (approximated to nearest integer). The Corrected input query matching score of part 2=2002*0.04993=100 (approximated to nearest integer).

The maximum matched-part matching score=8100, and so MPRTF=1/(8100*0.01)=0.0123. This results in a Corrected matched-part matching score of part 1=100*0.0123=1 (approximated to nearest integer). The Corrected matched-part matching score of part 2=8100* 0.0123=100 (approximated to nearest integer).

A full example of the implementation of the method according to one embodiment of the invention is as follows. In this example, the part numbers database contains the part numbers: "1234", "1234abcd" and "abcd" and the input query part number to be analyzed is "123".

Parsing the stored part numbers in the part numbers database generates the following primary and secondary components:

| Stored Part Number | Primary Components | Secondary Components |
|---|---|---|
| 1234 | 1234 | 123, 234 |
| 1234abcd | 1234, abcd | 123, 234, abc, bcd |
| Abcd | Abcd | abc, bcd |

Primary components relevance scores are calculated as follows, using the above noted formulas a) RS(primary numeric component)=length of component*ACW*CFn, and b) RS(primary alphabetic component)=length of component*ACW*CFa:

| Stored Part Number | Primary Components | Sum of Character Factors (SCF) | Average Character Weight (ACW) | Relevance Score (RS) |
|---|---|---|---|---|
| 1234 | 1234 | 2+2+2+2=8 | 10000/8 = 1250 | 10000 |
| 1234abcd | 1234 | 2+2+2+2+1+1+1+1=12 | 10000/12 = 833.3 | 6667 |
|  | abcd | 2+2+2+2+1+1+1+1=12 | 10000/12 = 833.3 | 3333 |
| abcd | abcd | 1+1+1+1=4 | 10000/4 = 2500 | 10000 |

Secondary components relevance scores are calculated as follows, using the above noted formulas c) RS(secondary numeric component where trailing characters are omitted)= (Length of secondary component/length of parent primary component)*RS(parent primary component)*TCNSCF, d) RS(secondary numeric component where leading characters are omitted)=(Length of secondary component/length of parent primary component)*RS(parent primary component) *LCNSCF, and e) RS(alphabet secondary components)= (Length of secondary component/length of parent primary component)*RS(parent primary component)*ASCF:

| Stored Part Number | Secondary Components | Parent primary Component Relevance Score | Secondary Component Relevance Score (RS) |
|---|---|---|---|
| 1234 | 123 | 10000 | 7500 |
|  | 234 | 10000 | 3750 |
| 1234abcd | 123 | 6667 | 5000 |
|  | 234 | 6667 | 2500 |
|  | abc | 3333 | 1250 |
|  | bcd | 3333 | 1250 |
| Abcd | abc | 10000 | 3750 |
|  | bcd | 10000 | 3750 |

The parts components' index is therefore the following:

| Stored Part Number | Component | Component Type | Relevance Score |
|---|---|---|---|
| "1234" | "1234" | Primary | 10000 |
| "1234" | "123" | Secondary - omitting trailing | 7500 |
| "1234" | "234" | Secondary - omitting leading | 3750 |
| "1234abcd" | "1234" | Primary | 6667 |
| "1234abcd" | "abcd" | Primary | 3333 |
| "1234abcd" | "123" | Secondary - omitting trailing | 5000 |
| "1234abcd" | "234" | Secondary - omitting leading | 2500 |
| "1234abcd" | "abc" | Secondary - omitting trailing | 1250 |
| "1234abcd" | "bcd" | Secondary - omitting leading | 1250 |
| "abcd" | "abcd" | Primary | 10000 |
| "abcd" | "abc" | Secondary - omitting trailing | 3750 |
| "abcd" | "bcd" | Secondary - omitting leading | 3750 |

The input query part number "123" is processed as follows using the same formulas identified above. Its primary component is 123 with a relevance score of 10000 (i.e., character count (3)*10000/ACW (6)*CFn (2)=10000). In a similar fashion, its secondary components are "12" and "23" with relevance scores of 6667 and 3333 respectively.

According to one embodiment of the method, stored part numbers that match the query part number are then identified from the parts components index. In this example, all stored part numbers where one or more of the query part number components "123", "12" or "23" match a component of a stored part number are identified. The result is:

| Stored Part Number | Component | Component Type | Relevance Score |
|---|---|---|---|
| 1234 | 123 | Secondary - omitting trailing | 7500 |
| 1234abcd | 123 | Secondary - omitting trailing | 5000 |

Grouping by part number and calculating ranking metrics, as described above, results in:

| Stored Part Number | Input Query Part Number Matching Score | Matched Part Matching Score | Number of Matched Components |
|---|---|---|---|
| 1234 | 10000 | 7500 | 1 |
| 1234abcd | 10000 | 5000 | 1 | where the input query part number matching score=sum of the relevance scores of the components in the query part number where a match has been found with a component in the identified stored part number, and where the matched part matching score=sum of the relevance scores of the matching components in the identified stored part number.

Calculating correction factors at a tolerance factor of 0.01 (1%) and a maximum input query matching score=10000 results in the following: IQRTF=1/(10000*0.01)=0.01. Similarly, the maximum matched-part matching score=7500, and so MPRTF=1/(7500*0.01)=0.01333. The Corrected input query matching score and Corrected matched part matching score are as follows:

| Stored Part Number | Corrected Input Query Part Number Matching Score | Corrected Matched Part Matching Score | Number of Matched Components |
|---|---|---|---|
| 1234 | 10000 * 0.01 = 100 | 7500 * 0.01333 = 100 | 1 |
| 1234abcd | 10000 * 0.01 = 100 | 5000 * 0.01333 = 67 | 1 |

Sorting the matching parts in the above table in descending order of column 2 then 3 then 4, as explained above (i.e., the Level 1, Level 2, and Level 3 sorting), results in a sorting where part number "1234" is listed first, followed by part number "1234abcd".

Another more complex example is as follows. Let the stored part numbers catalog include the following part numbers: "1234", "1234abcd", "abcd", "abc-xyz" and "567-xyz". In this example, the query part number to be processed is "1234abcd".

Parsing the stored part numbers creates the following primary and secondary components:

| Part Number | Primary Components | Secondary Components |
|---|---|---|
| "1234" | "1234" | "123", "234" |
| "1234abcd" | "1234", "abcd" | "123", "234", "abc", "bcd" |
| "abcd" | "abcd" | "abc", "bcd" |
| "abc-xyz" | "abc", "xyz" | "ab", "bc", "xy", "yz" |
| "567-xyz" | "567", "xyz" | "56", "67", "xy", "yz" |

Calculating the primary components relevance scores results in the following, using the same formulas described above:

| Stored Part Number | Primary Components | Sum of Character Factors (SCF) | Average Character Weight (ACW) | Relevance Score (RS) |
|---|---|---|---|---|
| "1234" | "1234" | 8 | 1250 | 10000 |
| "1234abcd" | "1234" | 12 | 833.3 | 6667 |
|  | "abcd" | 12 | 833.3 | 3333 |
| "abcd" | "abcd" | 4 | 2500 | 10000 |
| "abc-xyz" | "abc" | 6 | 1666.67 | 5000 |
|  | "xyz" | 6 | 1666.67 | 5000 |
| "567-xyz" | "567" | 9 | 1111.11 | 6667 |
|  | "xyz" | 9 | 1111.11 | 3333 |

Calculating the secondary components relevance scores results in the following, using the same formulas described above:

| Stored Part Number | Secondary Component | Parent Primary Component Relevance Score | Secondary Component Relevance Score (RS) |
|---|---|---|---|
| "1234" | "123" | 10000 | 7500 |
|  | "234" | 10000 | 3750 |
| "1234abcd" | "123" | 6667 | 5000 |
|  | "234" | 6667 | 2500 |
|  | "abc" | 3333 | 1250 |
|  | "bcd" | 3333 | 1250 |
| "abcd" | "abc" | 10000 | 3750 |

-continued

| Stored Part Number | Secondary Component | Parent Primary Component Relevance Score | Secondary Component Relevance Score (RS) |
|---|---|---|---|
|  | "bcd" | 10000 | 3750 |
| "abc-xyz" | "ab" | 5000 | 1667 |
|  | "bc" | 5000 | 1667 |
|  | "xy" | 5000 | 1667 |
|  | "yz" | 5000 | 1667 |
| "567-xyz" | "56" | 6667 | 4444 |
|  | "67" | 6667 | 2222 |
|  | "xy" | 3333 | 1111 |
|  | "yz" | 3333 | 1111 |

The parts components' index is therefore the following:

| Part Number | Component | Component Type | Relevance Score |
|---|---|---|---|
| "1234" | "1234" | Primary | 10000 |
| "1234" | "123" | Secondary - omitting trailing | 7500 |
| "1234" | "234" | Secondary - omitting leading | 3750 |
| "1234abcd" | "1234" | Primary | 6667 |
| "1234abcd" | "abcd" | Primary | 3333 |
| "1234abcd" | "123" | Secondary - omitting trailing | 5000 |
| "1234abcd" | "234" | Secondary - omitting leading | 2500 |
| "1234abcd" | "abc" | Secondary - omitting trailing | 1250 |
| "1234abcd" | "bcd" | Secondary - omitting leading | 1250 |
| "abcd" | "abcd" | Primary | 10000 |
| "abcd" | "abc" | Secondary - omitting trailing | 3750 |
| "abcd" | "bcd" | Secondary - omitting leading | 3750 |
| "abc-xyz" | "abc" | Primary | 5000 |
| "abc-xyz" | "xyz" | Primary | 5000 |
| "abc-xyz" | "ab" | Secondary - omitting trailing | 1667 |
| "abc-xyz" | "bc" | Secondary - omitting leading | 1667 |
| "abc-xyz" | "xy" | Secondary - omitting trailing | 1667 |
| "abc-xyz" | "yz" | Secondary - omitting leading | 1667 |
| "567-xyz" | "567" | Primary | 6667 |
| "567-xyz" | "xyz" | Primary | 3333 |
| "567-xyz" | "56" | Secondary - omitting trailing | 4444 |
| "567-xyz" | "67" | Secondary - omitting leading | 2222 |
| "567-xyz" | "xy" | Secondary - omitting trailing | 1111 |
| "567-xyz" | "yz" | Secondary - omitting leading | 1111 |

Processing input query part number "1234abc", it includes primary components and "1234" and "abc", with relevance scores 7272 and 2728 respectively calculated as described above. The secondary components of the query part number are "123", "234", "ab" and "bc" with relevance scores 5454, 2727, 909, and 909 respectively.

Selecting matching parts from the stored part numbers in the components index, i.e., selecting all part number records where component="1234", "abc", "123", "234", "ab" and "bc" of the input query find a match results in the following:

| Part Number | Matching Component | Component Type | Relevance Score |
|---|---|---|---|
| "1234" | "1234" | Primary | 10000 |
| "1234" | "123" | Secondary - omitting trailing | 7500 |
| "1234" | "234" | Secondary - omitting leading | 3750 |
| "1234abcd" | "1234" | Primary | 6667 |
| "1234abcd" | "123" | Secondary - omitting trailing | 5000 |
| "1234abcd" | "234" | Secondary - omitting leading | 2500 |
| "1234abcd" | "abc" | Secondary - omitting trailing | 1250 |
| "abcd" | "abc" | Secondary - omitting trailing | 3750 |
| "abc-xyz" | "abc" | Primary | 5000 |
| "abc-xyz" | "ab" | Secondary - omitting trailing | 1667 |
| "abc-xyz" | "bc" | Secondary - omitting leading | 1667 |

Grouping by part number and calculating ranking metrics in the same fashion as described above results in the following:

| Stored Part Number | Input Query Part Number Matching Score | Matched Part Matching Score | Number of Matched Components |
|---|---|---|---|
| "1234" | 15453 | 21250 | 3 |
| "1234abcd" | 18181 | 15417 | 4 |
| "abcd" | 2728 | 3750 | 1 |
| "abc-xyz" | 4546 | 8334 | 3 |

Calculating correction factors at a tolerance factor of 0.01 (1%) and a maximum input query matching score=18181, results in the following: IQRTF=1/(18181*0.01)=0.0055. Similarly, maximum matched-part matching score=21250, and so MPRTF=1/(21250*0.01) =0.0047. The Corrected input query matching score and Corrected matched part matching score are as follows:

| Stored Part Number | Corrected Input Query Part Number Matching Score | Corrected Matched Part Matching Score | Number of Matched Components |
|---|---|---|---|
| "1234" | 15453 * 0.0055 = 85 | 21250 * 0.0047 = 100 | 3 |
| "1234abcd" | 18181 * 0.0055 = 100 | 15417 * 0.0047 = 72 | 4 |
| "abcd" | 2728 * 0.0055 = 15 | 3750 * 0.0047 = 18 | 1 |
| "abc-xyz" | 4546 * 0.0055 = 25 | 8334 * 0.0047 = 39 | 3 |

Sorting the matching parts in the above table in descending order of column 2 then 3 then 4, as explained above (i.e., the Level 1, Level 2, and Level 3 sorting, described above), results in a sorting where the part numbers are sorted entirely with numbers in column 2 as follows:

"1234abcd"
"1234"
"abc-xyz"
"abcd"

Note that the numbers in column 3 only become relevant where the input query part number matching scores for more than one stored part number are the same. Similarly, the numbers in column 4 only become relevant where both the input query part number matching scores and the matching part matching scores are the same for more than one stored part number.

The above sections identify matching part numbers with a rank based on component matching but they do not take into consideration the order of the matching components in the input query part number compared to the order of the matching components of the stored part numbers. In one embodiment of the invention, an algorithm is added that also takes into account the order of the matching components.

Consider the exemplary case where the two part numbers "1234abcd" and "abcd1234" exist in the stored part number database. When the user enters the input query part number "1234abcd", the order of the returned results preferably takes into account the relative components order. In other words, the results should show part number 1234abcd before part number abcd1234.

In order to take the relative components order into account, a third type of component is used, the composite component. A composite component is defined as a concatenation of two adjacent primary components. For example, in part number 123-567 there are two primary components 123 and 567, and a single composite component 123567. In part number 123abc456, which has three primary components, there are two composite components: 123abc and abc456. More generally, the number of composite components in a given part number is one less than the number of primary components in the part number.

Figure 1B:
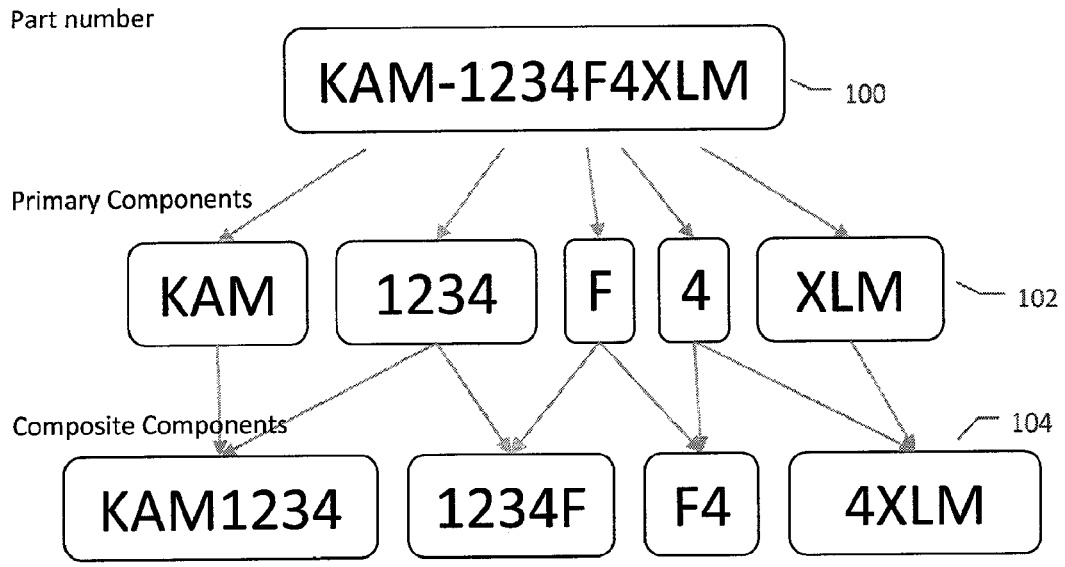
FIG. 1 illustrates various ways in which a part number may be parsed into components, and includes FIG. 1A, a diagram showing the parsing of an exemplary part number into primary components and secondary components according to one embodiment of the invention, FIG. 1B, a diagram showing the parsing of an exemplary part number into primary components and composite components according to one embodiment of the invention, and FIG. 1C, a diagram showing the parsing of an exemplary part number's part description into keyword components according to one embodiment of the invention.

FIG. 1B is a diagram showing the parsing of an exemplary part number KAM-1234F4XLM into primary components (102) and composite components (104) according to one embodiment of the invention. As can be seen, each composite component is generated by merging or linking together each pair of consecutive primary components in the part number.

In this embodiment, composite components are generated for each of the stored part numbers in addition to their primary and secondary components. As seen in FIG. 3 at (214), each generated composite component for each stored part number has a relevance score calculated and the result stored. Composite components must also be generated for the input query part number. The composite components and their associated relevance scores are also stored in the index (206) with the primary and secondary components.

In one embodiment, the relevance score of a composite component is equal to the sum of the relevance scores of its primary components. These relevance scores are added to the first and second sums, described above, for any composite components in an identified stored part number that match a composite component in the query part number in the same manner that the relevance scores of matched primary and secondary components are summed. More specifically, for each identified stored part number, the first sum further includes the addition of the relevance scores of the one or more composite components of said query part number that match a composite component of the identified stored part number and the second sum further includes the addition of the relevance scores of the one or more composite components of the identified stored part number that match a query composite component.

The composite components allow the taking into account of component orders as illustrated in the following example. For the two part numbers "1234abcd" and "abcd1234", there will be two more records in the component index: "1234abcd" and "abcd1234", which are the composite components. For the input query part number, there will be an extra component "1234abcd" which is the composite component. The matching of the newly added composite components to the input query part number will increase the ranking score for the stored part number having an exact match over stored part numbers where the positions of 1234 and abcd are swapped, thus causing part number 1234abcd to be listed first in the search results.

The use of composite components will generally resolve the above described relative order problems, even those containing more than two primary components, due to the fact that the number of composite components equals the number of primary components minus one. As another example, if the stored part numbers are 123abc456 and abc456-123. The composite components are 123abc and abc456 for the first part number, and abc456 and 456123 for the second part number. If the user enters 123abc as the query part number, the user expects to see stored part number 123abc456 first in the results. The composite component of the input query part number is 123abc. This component will match the composite component 123abc of the stored part number 123abc456 and therefore this match will increase the rank of this stored part number, which will make it appear first in the results.

As a further example, if the stored part numbers catalog contains the part numbers: "X12", "12-X" and "67", and an input query part number "12-X", the parsing of these stored part numbers generates the following primary and secondary components:

| Stored Part Number | Primary Components | Secondary Components |
|---|---|---|
| "X12" | "X", "12" | None |
| "12-X" | "12", "X" | None |
| "67" | "67" | None |

Calculating primary components relevance scores, as described above, results in:

| Stored Part Number | Primary Component | Sum of Character Factors (SCF) | Average Character Weight (ACW) | Relevance Score (RS) |
|---|---|---|---|---|
| "X12" | "X" | 5 | 2000 | 2000 |
| "X12" | "12" | 5 | 2000 | 8000 |
| "12-X" | "12" | 5 | 2000 | 8000 |
| "12-X" | "X" | 5 | 2000 | 2000 |
| "67" | "67" | 4 | 2500 | 10000 |

In this example, there are no secondary components to calculate relevance scores for.

Generating composite components and calculating relevance scores results in the following:

| Stored Part Number | Composite Component | Relevance Score (RS) |
|---|---|---|
| "X12" | "X12" | 2000 + 8000 = 10000 |
| "12-X" | "12X" | 8000 + 2000 = 10000 |

The parts components' index is therefore the following:

| Stored Part Number | Component | Component Type | Relevance Score |
|---|---|---|---|
| "X12" | "X" | Primary | 2000 |
| "X12" | "12" | Primary | 8000 |
| "X12" | "X12" | Composite | 10000 |
| "12-X" | "12" | Primary | 8000 |
| "12-X" | "X" | Primary | 2000 |
| "12-X" | "12X" | Composite | 10000 |
| "67" | "67" | Primary | 10000 |

An input query part number "12-X" is processed as follows. This query part number has primary components: "12", "X" with relevance scores: 8000, 2000 respectively, and no secondary components. However, it has a composite component "12X" with a relevance score of 10000. The matching parts from the components' index are then identified, that is, all of the stored part number records are selected where a primary or composite component is "12", "X", or "12X".

| Stored Part Number | Component | Component Type | Relevance Score |
|---|---|---|---|
| "X12" | "X" | Primary | 2000 |
| "X12" | "12" | Primary | 8000 |
| "12-X" | "12" | Primary | 8000 |
| "12-X" | "X" | Primary | 2000 |
| "12-X" | "12X" | Composite | 10000 |

Grouping by part number and calculating ranking metrics, in the same fashion as described above, results in the following:

| Stored Part Number | Query Matching Score | Matched Part Matching Score | Number of Matched Components |
|---|---|---|---|
| "X12" | 10000 | 10000 | 2 (2 primaries) |
| "12-X" | 20000 | 20000 | 3 (2 primaries + 1 composite) |

Calculating correction factors at a tolerance factor of 0.01 (1%), with a maximum Input query matching score=20000 results in IQRTF=1/(20000*0.01)=0.005. Similarly, a maximum matched-part matching score=20000 results in MPRTF=1/(20000*0.01)=0.005. The result is the following:

| Stored Part Number | Corrected Query Matching Score | Corrected Matched Part Matching Score | Number of Matched Components |
|---|---|---|---|
| "X12" | 10000 * 0.005 = 50 | 10000 * 0.005 = 50 | 2 (2 primaries) |
| "12-X" | 20000 * 0.005 = 100 | 20000 * 0.005 = 100 | 3 (2 primaries + 1 composite) |

Sorting the matching parts according to the above described ranking metrics, we come up with the results: "12-X" and "X12" respectively, i.e., an exact match is now shown before the result with swapped order.

One important note about components matching is that matching can be defined to occur between components of different types and still provide valid relevance scoring. For example, a composite component in the query could match a primary component in a stored part number and vice versa, and the matching scores adjusted accordingly.

The above embodiment does not resolve all ordering issues. Consider the case where two part numbers "NV-1234" and "1234-NV" exist in the stored part numbers database. When a user enters a query like "1234", the order of the returned results is not guaranteed to show the "1234-NV" match first due to the fact that the above described embodiment of search algorithm so far (even with relative components order) does not take into account the absolute components position.

The absolute components position is defined to be an integer representing the position of a certain component within its parent part number. For example, part number 123 XYZ 456 consists of three primary components: 123, XYZ and 456 with component orders: 123=1, XYZ=2 and 456=3 respectively. In one embodiment, secondary components have the same component position as the parent primary component and composite components have the smallest component position of its two children primary components.

In one embodiment, component position numbers are assigned as follows. A component position number is assigned to each primary component of said query part number and to each primary component of each said stored part number that corresponds to the position of the component within the respective part number, starting from the left. The same component position number is assigned to each secondary component of a given primary component. Each composite component is assigned the smaller of the two component position numbers assigned to the primary components that make up the respective composite component. The resultant component position numbers for each component are stored in a digital memory. A fourth sum is then calculated for each identified stored part number that is equal to the sum of the absolute values of the difference between the component position number of a query component and the component position number of a matched component of said identified stored part number for each matched component.

The absolute components position of components is integrated in the search algorithm according to one embodiment as follows. The stored part numbers components' index map is modified to include the absolute component position in addition to the other fields.

| Part Number | Component | Component Type | Relevance Score | Absolute Component Position |
|---|---|---|---|---|
| 1234 | 1234 | Primary | 10000 | 1 |
| 1234 | 123 | Secondary - omitting trailing | 7500 | 1 |
| 1234 | 234 | Secondary - omitting leading | 3750 | 1 |
| 1234abcd | 1234 | Primary | 6667 | 1 |
| 1234abcd | Abcd | Primary | 3333 | 2 |
| 1234abcd | 123 | Secondary - omitting trailing | 5000 | 1 |
| 1234abcd | 234 | Secondary - omitting leading | 2500 | 1 |
| 1234abcd | Abc | Secondary - omitting trailing | 1250 | 2 |
| 1234abcd | Bcd | Secondary - omitting leading | 1250 | 2 |
| Abcd | Abcd | Primary | 10000 | 1 |
| Abcd | Abc | Secondary - omitting trailing | 3750 | 1 |
| Abcd | Bcd | Secondary - omitting leading | 3750 | 1 |

The searching and ranking algorithm as modified in this embodiment, starts by parsing the input query part number into its primary, secondary, and composite components and calculating the relevance score of each component and the absolute component position. Using the component index, all of the stored part numbers which contain any of the components of the input query part number are identified. For each matched part, the following ranking metrics are calculated:

1) Query matching score=Σrelevance score of all matched components in the input query.

2) Matched part matching score=Σrelevance score of matched components in the matched part.

3) Number of matched components between input query and matched part.

4) Order matching score=Σ absolute value(query component order−matched component order).

In one embodiment, the matched part numbers are sorted as follows: in descending order of the query matching score calculated in 1); then in descending order of matched part matching score calculated in 2) for any part numbers whose first sums are the same; then in ascending order of the order matching score calculated in 4) for any part numbers whose first and second sums are the same; and then in descending order of the number of matched components calculated in 3) for any part numbers whose first, second, and fourth sums are the same.

For example, if the part numbers catalog contains the stored part numbers "X12", "12-X" and "67" and if the input query part number is "12", parsing the stored part numbers generates the following primary and secondary components:

| Stored Part Number | Primary Components | Secondary Components |
|---|---|---|
| "X12" | "X", "12" | None |
| "12-X" | "12", "X" | None |
| "67" | "67" | None |

Calculating primary components relevance scores, as described above, results in the following.

| Stored Part Number | Primary Component | Sum of Character Factors (SCF) | Average Character Weight (ACW) | Relevance Score (RS) |
|---|---|---|---|---|
| "X12" | "X" | 5 | 2000 | 2000 |
| "X12" | "12" | 5 | 2000 | 8000 |
| "12-X" | "12" | 5 | 2000 | 8000 |
| "12-X" | "X" | 5 | 2000 | 2000 |
| "67" | "67" | 4 | 2500 | 10000 |

In this example, there are no secondary components to calculate relevance scores for.

Generating composite components and calculating relevance scores, in the fashion described above, results in:

| Stored Part Number | Composite Component | Relevance Score |
|---|---|---|
| "X12" | "X12" | 10000 |
| "12-X" | "12X" | 10000 |

The parts components' index is therefore the following:

| Stored Part Number | Component | Component Type | Relevance Score | Absolute Component Position |
|---|---|---|---|---|
| "X12" | "X" | Primary | 2000 | 1 |
| "X12" | "12" | Primary | 8000 | 2 |
| "X12" | "X12" | Composite | 10000 | 1 |
| "12-X" | "12" | Primary | 8000 | 1 |
| "12-X" | "X" | Primary | 2000 | 2 |
| "12-X" | "12X" | Composite | 10000 | 1 |
| "67" | "67" | Primary | 10000 | 1 |

Processing input query "12", this part number has one primary component: "12" with a relevance score of 10000 and an absolute component order of 1, no secondary components, and no composite components.

Identifying matching parts from stored parts numbers in the components' index–that is selecting all records where a primary, secondary or composite component="12", results in:

| Stored Part Number | Component | Component Type | Relevance Score | Absolute Component Position |
|---|---|---|---|---|
| "X12" | "12" | Primary | 8000 | 2 |
| "12-X" | "12" | Primary | 8000 | 1 |

Grouping by part number and calculating ranking metrics results in the following:

| Stored Part Number | Query Matching Score | Matched Part Matching Score | Number of Matched Components | Order Matching Score |
|---|---|---|---|---|
| "X12" | 10000 | 8000 | 1 | 1 = abs (2-1) |
| "12-X" | 10000 | 8000 | 1 | 0 = abs (1-1) |

Sorting the matching parts according to the ranking metrics described above results in the following order of stored part numbers: "12-X" and "X12".

Figure 1C:
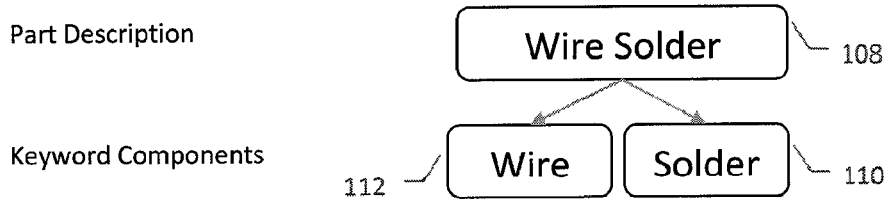

The method of the present invention according to one embodiment also integrates a descriptive text/keyword search with the part number search. The details of exemplary text/keyword search algorithm implementations are well known and so are not described. The ranking and integration steps according to this embodiment can be applied to any text/keyword search algorithm. To use text/keyword searching, we assume each part/product has a part description attribute (108) attached to it, as seen in FIG. 1C, that can be used as the basis for descriptive text/keywords. The embodiment can be generalized to include as a search term any other attributes like category, tags, datasheet, etc.

To implement a descriptive text/keyword search, the method according to one embodiment includes a new component type, the descriptive keyword component. A keyword component is any keyword found in the part/product description. As seen in FIG. 1C, the exemplary part description (108) includes two key words, Solder (110) and Wire (112). The identification of the keyword is left to the details of the text/keyword search implementation. For example, whether to do any of the following: dictionary lookup, morphological analysis/stemming, dummy (i.e., unimportant or excluded) words removal, is within the specification of the text search algorithm embodiment selected and integrated into the search process.

According to one embodiment, each descriptive keyword component (110, 112) is assigned a relevance score using a relevance function which is preferably also developed based on the text/keyword search algorithm used. The flowchart in FIG. 3 illustrates one embodiment of how the part description is parsed (200), the descriptive keywords identified (202), and the relevance score calculated for each keyword (204). For example, the tf–idf weight (term frequency-inverse document frequency) known in the art may be used to build a relevance function.

In one embodiment of the keyword relevance a matched descriptive keyword component is given a numerical weight to make it more important than a matched part-number component. For example, consider two part numbers, "123abc" which includes the descriptor "hose", and "567xyz" which includes the descriptor "brakes". When a user enters a search query of: "123 brakes", the stored part number relevance function and the keyword relevance function will determine which part number is listed first. In this embodiment, the part number 567xyz brakes will be listed first.

The keyword components and their relevance scores are both saved with other components (primary, secondary and composite components) in the components' index database (206, 312), as shown in FIGS. 3 and 4.

When a user enters a search query part number which includes a descriptor, it is processed as follows, as seen in FIG. 4. Using an English dictionary (or some other technique depending on the integrated text-search algorithm), the English components of the query are identified and marked as keyword components (304). The non-English components are parsed the same way part numbers are handled and divided into components: primary, secondary and composite components (306). Then the relevance scores are calculated for both English and Non-English component parts, at (308) and (306), respectively. The rest of the search algorithm continues in the same way as the above described embodiments of the part number search algorithm. In one embodiment, therefore, for each identified stored part number, the first sum further includes the addition of the relevance scores of the one or more descriptive keywords of said query part number that match a descriptive keyword of the identified stored part number and the second sum further includes the addition of the relevance scores of the one or more descriptive keywords of the identified stored part number that match a query descriptive keyword.

The following is an example of this embodiment of the keyword search algorithm according to one embodiment, where the part database contains the parts: "1234": Hose, "1234abcd": Brakes, and "abed": Brakes, and an input query part number of "123 Brakes". Parsing these part numbers generates the following primary, secondary and keyword components:

| Stored Part Number | Primary Components | Secondary Components | Keyword Components |
|---|---|---|---|
| 1234 | 1234 | 123, 234 | Hose |
| 1234abcd | 1234, abcd | 123, 234, abc, bcd | Brakes |
| Abcd | Abcd | abc, bcd | Brakes |

Calculating primary components relevance scores, as described above, results in:

| Stored Part Number | Primary Components | Sum of Character Factors (SCF) | Average Character Weight (ACW) | Relevance Score (RS) |
|---|---|---|---|---|
| 1234 | 1234 | 2 + 2 + 2 + 2 = 8 | 10000/8 = 1250 | 10000 |
| 1234abcd | 1234 | 2 + 2 + 2 + 2 + 1 + 1 + 1 + 1 = 12 | 10000/12 = 833.3 | 6667 |
|  | abcd | 2 + 2 + 2 + 2 + 1 + 1 + 1 + 1 = 12 | 10000/12 = 833.3 | 3333 |
| Abcd | abcd | 1 + 1 + 1 + 1 = 4 | 10000/4 = 2500 | 10000 |

Calculating secondary components relevance scores, as described above, results in:

| Stored Part Number | Secondary Components | Parent Component Relevance Score | Relevance Score (RS) |
|---|---|---|---|
| 1234 | 123 | 10000 | 7500 |
|  | 234 | 10000 | 3750 |
| 1234abcd | 123 | 6667 | 5000 |
|  | 234 | 6667 | 2500 |
|  | abc | 3333 | 1250 |
|  | bcd | 3333 | 1250 |
| Abcd | abc | 10000 | 3750 |
|  | bcd | 10000 | 3750 |

Keyword components relevance scores can be calculated in one embodiment as follows. For simplicity, a constant keyword relevance function KRc(k)=20000 is used to thereby give the keyword search term more importance than the alphanumeric characters in the stored part number. The resulting relevance scores are as follows:

| Stored Part Number | Keyword Components | Relevance Score |
|---|---|---|
| 1234 | Hose | 20000 |
| 1234abcd | Brakes | 20000 |
| abcd | Brakes | 20000 |

The parts components' index is therefore the following:

| Stored Part Number | Component | Component Type | Relevance Score (RS) |
|---|---|---|---|
| "1234" | "Hose" | Keyword | 20000 |
| "1234" | "1234" | Primary | 10000 |
| "1234" | "123" | Secondary - omitting trailing | 7500 |
| "1234" | "234" | Secondary - omitting leading | 3750 |
| "1234abcd" | "Brakes" | Keyword | 20000 |
| "1234abcd" | "1234" | Primary | 6667 |
| "1234abcd" | "abcd" | Primary | 3333 |
| "1234abcd" | "123" | Secondary - omitting trailing | 5000 |
| "1234abcd" | "234" | Secondary - omitting leading | 2500 |
| "1234abcd" | "abc" | Secondary - omitting trailing | 1250 |
| "1234abcd" | "bcd" | Secondary - omitting leading | 1250 |
| "abcd" | "Brakes" | Keyword | 20000 |
| "abcd" | "abcd" | Primary | 10000 |
| "abcd" | "abc" | Secondary - omitting trailing | 3750 |
| "abcd" | "bcd" | Secondary - omitting leading | 3750 |

Processing input query "123 Brakes" results in a primary component of 123 with a relevance score of 10000, secondary components: "12", "23" with relevance scores 6667 and 3333, respectively, and keyword components: "Brakes" with a relevance score of 20000.

Identifying matching parts from the components index, i.e., selecting all stored part number records where components="123", "12", "23" or "Brakes" are found results in:

| Stored Part Number | Component | Component Type | Relevance Score (RS) |
|---|---|---|---|
| "1234" | "123" | Secondary - omitting trailing | 7500 |
| "1234abcd" | "Brakes" | Keyword | 20000 |
| "1234abcd" | "123" | Secondary - omitting trailing | 5000 |
| "abcd" | "Brakes" | Keyword | 20000 |

Grouping by part number and calculating ranking metrics, in the same fashion as described above, results in the following:

| Stored Part Number | Input Query Part Number Matching Score | Matched Part Matching Score | Number of Matched Components |
|---|---|---|---|
| "1234abcd" | 30000 | 25000 | 2 |
| "abcd" | 20000 | 20000 | 1 |
| "1234" | 10000 | 7500 | 1 |

Sorting the matching parts in the above table in descending order of column 2 then 3 then 4, as explained above, results in the following sort: part number "1234abcd", followed by part number "abcd", followed by part number "1234".

Figure 5:
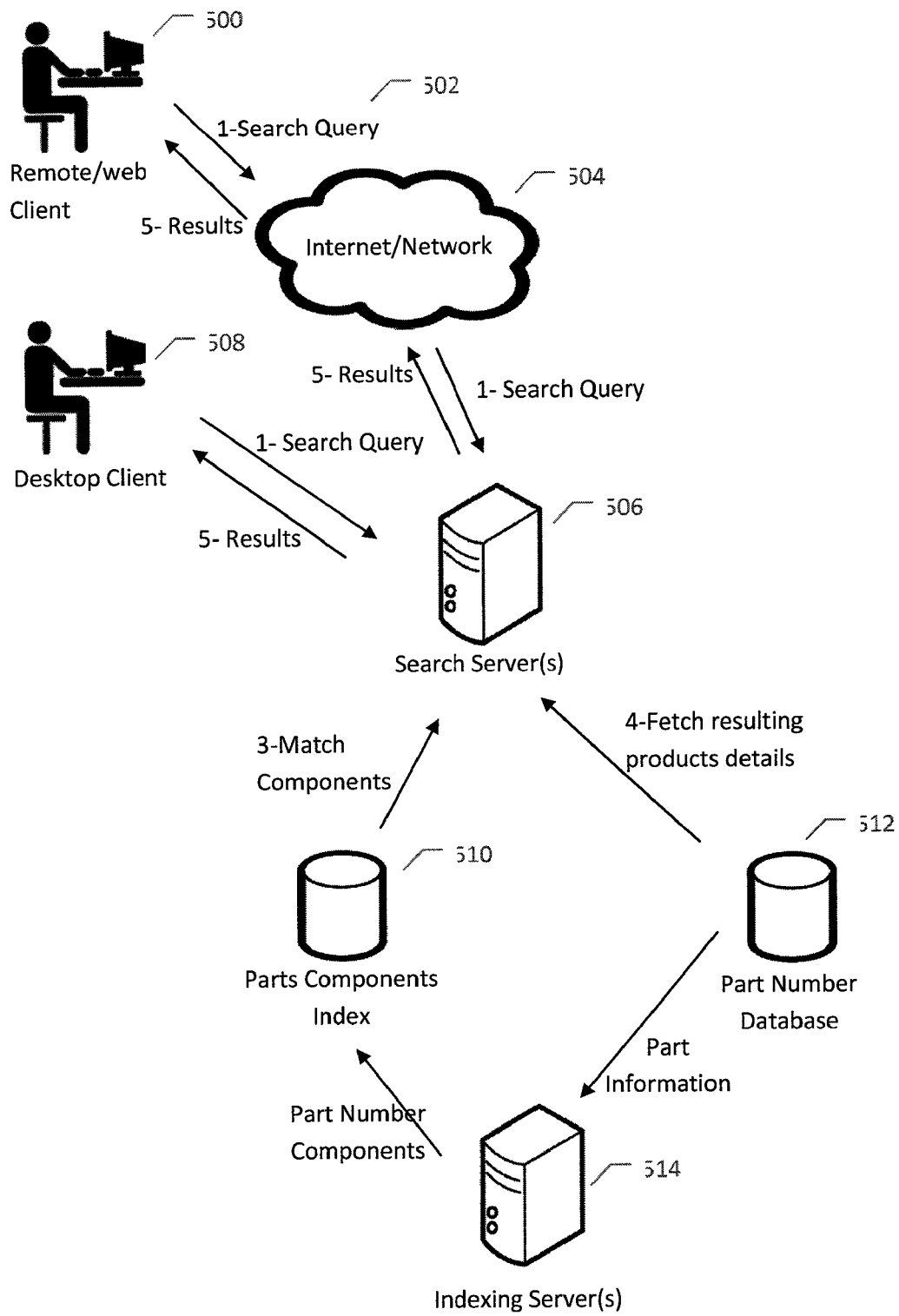
FIG. 5 is a system for implementing a part number search method according to one embodiment of the invention.

FIG. 5 is a computer-implemented system for performing part number searches according to one embodiment of the invention. The system described in FIG. 5 can be designed as a client/server model like web applications/enterprise applications (500) where a user is querying a remote products catalog, or as a standalone desktop application (508) where the user is querying a local products catalog, or in other ways known in the art.

In operation, according to one embodiment of the invention, the user enters a search query (502) that is forwarded to a searching server(s) (506). This can be a direct input, in case of a local catalog (508), or it can be input through the network/internet (504) in case of a client/server model (500). The searching server(s) (506), acting as a first data processor, uses the parts components index (510), stored in a digital memory, to perform components matching according to various embodiments of the invention described above, and identify the resulting part numbers and enabling them to be displayed to the user (at 500 or 508). The searching server(s) (506) uses the original stored part numbers database (512), stored in the same digital memory as the parts components index or in a different memory, as shown, to fetch all the details for the resulting part numbers to be shown to the user. An indexing server(s) (514), acting as a second data processor, is responsible for building and maintaining the parts components index (510) by continuous monitoring of the original part numbers database (512) or by using insertion/update triggers. It is within normal skill in the art to implement searching server (506) and indexing server (514) in a single computer/data processor.

In one embodiment, the system for performing part number searches comprises digital memory (512) having a database of part numbers stored therein, a data processor (514) configured to parse each stored part number into one or more primary components, secondary components, and composite components based on a first predetermined set of rules; to calculate a relevance score for each component of each said stored part number; and to store each said relevance score in a second digital memory (510) or in the same digital memory (512) in which the part numbers database is stored. A user interface, implemented in one embodiment as data processor (506) enables a user to input a query part number. The user interface data processor (506) is configured to parse said query part number into one or more query primary components, query secondary components, and query composite components based on the first predetermined set of rules, or some other predetermined set of rules, and to calculate a relevance score for each query component of said query part number. This data is preferably stored in a digital memory in data processor (506). User interface data processor (506) is further configured to search the parts component index memory (510) and to identify each stored part number that has at least one component that matches a stored query component of said query part number. User interface data processor (506) is interface further configured for enabling the display to the user of the one or more identified stored part numbers in descending numerical order as a function of a first sum equal to the sum of the relevance scores of the one or more query components of the query part number that match a component of the identified stored part number, and for enabling the display to the user of the one or more stored part numbers in descending numerical order as a function of a second sum equal to the sum of the relevance scores of the one or more components of the identified stored part number that match a query component for any identified stored part numbers whose first sums are the same.

In one embodiment, user interface data processor (506) is further configured assign a component position number to each primary component of said query part number and to each primary component of each said stored part number, said component position number corresponding to the position of the component within the respective part number, assign the same component position number to each secondary component of a given primary component, and assign to each composite component the smaller of the two component position numbers assigned to the primary components that make up the respective composite component, and storing said component position numbers in a digital memory. User interface data processor (506) is further configured to enable the display to the user of the one or more stored part numbers in ascending numerical order as a function of a fourth sum equal to the sum of the absolute values of the difference between the component position number of a query component and the component position number of a matched component of said identified stored part number for each matched component for any identified stored part numbers whose first and second sums are the same, and to enable the display to the user of the one or more part numbers in descending numerical order as a function of a third sum equal to the number of components in the identified stored part number that match components in said query part number for any identified stored part numbers whose first, second, and fourth sums are the same.

The present invention has been described in relation to particular examples, which are intended in all respects to be illustrative rather than restrictive. Those skilled in the art will appreciate that many different combinations of circuits will be suitable for practicing the present invention. Moreover, other implementations of the invention will be apparent to those skilled in the art from consideration of the specification and practice of the invention disclosed herein. It is intended that the specification and examples therein be considered as exemplary only, with a true scope of the invention being indicated by the following claims.

What is claimed is:

1. A computer implemented method for identifying one or more part numbers in a database of part numbers stored in a digital memory comprising:
   parsing each stored part number into one or more primary components and secondary components based on a predetermined set of rules;
   calculating a relevance score for each component of each said stored part number as follows:
   assigning a weight factor WFa having a first predetermined value for alphabetic characters and a weight factor WFn having a second predetermined value for numeric characters in said part number, wherein the second predetermined value is higher than the first predetermined value;
   calculating the weight WPC of each primary component by multiplying the number of characters in the primary component by WFa if the primary component contains alphabetic characters and by WFn if the primary component contains numeric component;
calculating the sum of the weights WPC of the primary components SUM(WPCi) in said part number;
calculating the weight of each character WEC by dividing a predetermined constant by SUM(WPCi);
calculating the relevance score for each numeric primary component by multiplying the number of primary component characters times WFn times WEC;
calculating the relevance score for each alphabetic primary component by multiplying the number of primary component characters times WFa times WEC; and
for each secondary component of each primary component in said part number, calculating the relevance score as equal to the number of letters or numbers in the secondary component divided by the number of letters or numbers in the parent primary component times the relevance score of said parent primary component times a predetermined weighting factor, wherein the predetermined weighting factor for secondary components formed by omitting trailing characters in its parent primary component is a higher number than the weighting factor for secondary components formed by omitting leading characters in its parent primary component;
storing said relevance scores in said digital memory;
receiving a query part number and parsing it into one or more query primary components and query secondary components based on said first predetermined set of rules;
calculating a relevance score for each query component of said query part number as follows:
assigning a weight factor WFa having a first predetermined value for alphabetic characters and a weight factor WFn having a second predetermined value for numeric characters in said part number, wherein the second predetermined value is higher than the first predetermined value;
calculating the weight WPC of each primary component by multiplying the number of characters in the primary component by WFa if the primary component contains alphabetic characters and by WFn if the primary component contains numeric component;
calculating the sum of the weights WPC of the primary components SUM(WPCi) in said part number;
calculating the weight of each character WEC by dividing a predetermined constant by SUM(WPCi);
calculating the relevance score for each numeric primary component by multiplying the number of primary component characters times WFn times WEC;
calculating the relevance score for each alphabetic primary component by multiplying the number of primary component characters times WFa times WEC; and
for each secondary component of each primary component in said part number, calculating the relevance score as equal to the number of letters or numbers in the secondary component divided by the number of letters or numbers in the parent primary component times the relevance score of said parent primary component times a predetermined weighting factor, wherein the predetermined weighting factor for secondary components formed by omitting trailing characters in its parent primary component is a higher number than the weighting factor for secondary components formed by omitting leading characters in its parent primary component;
identifying each stored part number that has at least one component that matches a query component of said query part number;
calculating for each identified stored part number:

a) a first sum equal to the sum of the relevance scores of the one or more query components of the query part number that match a component of the identified stored part number;
b) a second sum equal to the sum of the relevance scores of the one or more components of the identified stored part number that match a query component; and
c) a third sum equal to the number of components in the identified stored part number that match components in said query part number;
sorting the identified stored part numbers in a predetermined numerical order as a function of said first sum;
sorting the identified stored part numbers in a predetermined numerical order as a function of said second sum for any identified stored part numbers whose first sums are the same; and
sorting the identified stored part numbers in descending numerical order as a function of said third sum for any identified stored part numbers whose first and second sums are the same, and
wherein said predetermined set of rules causes the parsing of each stored part number and each query part number into one or more primary components based on the following:
any contiguous set of one or more alphabet letters and any contiguous set of one or more numbers is a primary component, and wherein special characters, including but not limited to hyphens, dots, slashes, brackets and tabs, comprise primary component boundaries between adjacent letters and numbers; and
wherein said predetermined set of rules causes the parsing of each primary component of each part number into zero or more secondary components based on the following:
any subset of a primary component obtained by omitting one or more leading or trailing characters is a secondary component; and
the number of secondary components for a given primary component is a predetermined function of the primary component.

2. The method of claim 1, wherein the sorting of the identified stored part numbers is in a descending numerical order for each of said first and second sums.

3. The method of claim 1, further comprising:
applying a correction function to each of the first and second sums to remove less significant variations between such sums before the sorting of said identified stored part numbers as a function of said first and second sums.

4. The method of claim 1, further comprising:
identifying, for each stored part number having two or more primary components, one or more composite components, each composite component comprising an adjacent pair of primary components, such that the number of composite components in each stored part number is equal to the number of primary components less one;
identifying, for a query part number having two or more primary components, one or more composite components, each composite component comprising an adjacent pair of primary components, such that the number of composite components in said query part number is equal to the number of primary components less one; and
calculating a relevance score for each composite component of said query part number and each composite component of each said stored part number, said relevance score equal to the sum of the relevance scores of the two primary components that make up the composite component and storing said relevance score in a digital memory;

and wherein, for each identified stored part number, said first sum further includes the addition of the relevance scores of the one or more composite components of said query part number that match a composite component of the identified stored part number, and said second sum further includes the addition of the relevance scores of the one or more composite components of the identified stored part number that match a query composite component.

5. The method of claim 1, wherein the query part number is supplied by a user via a computer interface and wherein said method further comprises enabling the display of the sorted identified part numbers using said computer interface.

6. The method of claim 1, further comprising:
parsing each query part number to identify any keywords that describe the part associated with each part number;
parsing each part number stored in said database to identify any keywords that describe the part associated with that stored part number;
calculating a relevance score for each descriptive keyword of said query part number and each descriptive keyword of each said stored part number and storing said relevance score in a digital memory;
and wherein, for each identified stored part number, said first sum further includes the addition of the relevance scores of the one or more descriptive keywords of said query part number that match a descriptive keyword of the identified stored part number and said second sum further includes the addition of the relevance scores of the one or more descriptive keywords of the identified stored part number that match a query descriptive keyword.

7. The method of claim 4, further comprising:
assigning a component position number to each primary component of said query part number and to each primary component of each said stored part number, said component position number corresponding to the position of the component within the respective part number, assigning the same component position number to each secondary component of a given primary component, and assigning to each composite component the smaller of the two component position numbers assigned to the primary components that make up the respective composite component, and storing said component position numbers in a digital memory;
calculating for each identified stored part number a fourth sum equal to the sum of the absolute values of the difference between the component position number of a query component and the component position number of a matched component of said identified stored part number for each matched component;
sorting the identified stored part numbers in a predetermined numerical order as a function of said fourth sum for any identified stored part numbers whose first and second sums are the same.

8. The method of claim 7, wherein the sorting of the identified stored part numbers is in descending numerical order for each of said first and second sums and in ascending numerical order for said fourth sum.

9. A computer implemented method for identifying one or more part numbers in a database of part numbers stored in a digital memory comprising:

parsing each stored part number into one or more primary components, secondary components and composite components based on a predetermined set of rules;
calculating a relevance score for each component of each said stored part number as follows:
assigning a weight factor WFa having a first predetermined value for alphabetic characters and a weight factor WFn having a second predetermined value for numeric characters in said part number, wherein the second predetermined value is higher than the first predetermined value;
calculating the weight WPC of each primary component by multiplying the number of characters in the primary component by WFa if the primary component contains alphabetic characters and by WFn if the primary component contains numeric component;
calculating the sum of the weights WPC of the primary components SUM(WPCi) in said part number;
calculating the weight of each character WEC by dividing a predetermined constant by SUM(WPCi);
calculating the relevance score for each numeric primary component by multiplying the number of primary component characters times WFn times WEC;
calculating the relevance score for each alphabetic primary component by multiplying the number of primary component characters times WFa times WEC;
calculating the relevance score for each composite component by summing the relevance scores of its primary components; and
for each secondary component of each primary component in said part number, calculating the relevance score as equal to the number of letters or numbers in the secondary component divided by the number of letters or numbers in the parent primary component times the relevance score of said parent primary component times a predetermined weighting factor, wherein the predetermined weighting factor for secondary components formed by omitting trailing characters in its parent primary component is a higher number than the weighting factor for secondary components formed by omitting leading characters in its parent primary component;
storing said relevance scores in said digital memory;
receiving a query part number from a user via a computer interface and parsing it into one or more query primary components, query secondary components, and query composite components based on said predetermined set of rules;
calculating a relevance score for each query component of said query part number as follows:
assigning a weight factor WFa having a first predetermined value for alphabetic characters and a weight factor WFn having a second predetermined value for numeric characters in said part number, wherein the second predetermined value is higher than the first predetermined value;
calculating the weight WPC of each primary component by multiplying the number of characters in the primary component by WFa if the primary component contains alphabetic characters and by WFn if the primary component contains numeric component;
calculating the sum of the weights WPC of the primary components SUM(WPCi) in said part number;
calculating the weight of each character WEC by dividing a predetermined constant by SUM(WPCi);
calculating the relevance score for each numeric primary component by multiplying the number of primary component characters times WFn times WEC;

calculating the relevance score for each alphabetic primary component by multiplying the number of primary component characters times WFa times WEC;

calculating the relevance score for each composite component by summing the relevance scores of its primary components; and for each secondary component of each primary component in said part number, calculating the relevance score as equal to the number of letters or numbers in the secondary component divided by the number of letters or numbers in the parent primary component times the relevance score of said parent primary component times a predetermined weighting factor, wherein the predetermined weighting factor for secondary components formed by omitting trailing characters in its parent primary component is a higher number than the weighting factor for secondary components formed by omitting leading characters in its parent primary component;

identifying each stored part number that has at least one component that matches a query component of said query part number;

calculating for each identified stored part number:
a) a first sum equal to the sum of the relevance scores of the one or more query components of the query part number that match a component of the identified stored part number;
b) a second sum equal to the sum of the relevance scores of the one or more components of the identified stored part number that match a query component; and
c) a third sum equal to the number of components in the identified stored part number that match components in said query part number;

sorting the identified stored part numbers in descending numerical order as a function of said first sum;

sorting the identified stored part numbers in descending numerical order as a function of said second sum for any identified stored part numbers whose first sums are the same; and sorting the identified stored part numbers in descending numerical order as a function of said third sum for any identified stored part numbers whose first and second sums are the same; and enabling the display of the sorted identified part numbers using said computer interface.

10. The method of claim 9, further comprising:
assigning a component position number to each primary component of said query part number and to each primary component of each said stored part number, said component position number corresponding to the position of the component within the respective part number, assigning the same component position number to each secondary component of a given primary component, and assigning to each composite component the smaller of the two component position numbers assigned to the primary components that make up the respective composite component, and storing said component position numbers in a digital memory;

calculating for each identified stored part number a fourth sum equal to the sum of the absolute values of the difference between the component position number of a query component and the component position number of a matched component of said identified stored part number for each matched component; and sorting the identified stored part numbers in ascending numerical order as a function of said fourth sum for any identified stored part numbers whose first and second sums are the same.

11. The method of claim 9, further comprising:
parsing each query part number to identify any keywords that describe the part associated with each part number;
parsing each part number stored in said database to identify any keywords that describe the part associated with that stored part number;
calculating a relevance score for each descriptive keyword of said query part number and each descriptive keyword of each said stored part number and storing said relevance score in a digital memory;
and wherein, for each identified stored part number, said first sum further includes the addition of the relevance scores of the one or more descriptive keywords of said query part number that match a descriptive keyword of the identified stored part number and said second sum further includes the addition of the relevance scores of the one or more descriptive keywords of the identified stored part number that match a query descriptive keyword.

12. A computer-implemented system for performing part number searches comprising:
a digital memory having a database of part numbers stored therein;
a data processor configured to parse each stored part number into one or more primary components and secondary components based on a predetermined set of rules comprising the following:
i) any contiguous set of one or more alphabet letters and any contiguous set of one or more numbers is a primary component, and wherein special characters, including but not limited to hyphens, dots, slashes, brackets and tabs, comprise primary component boundaries between adjacent letters and numbers; and
ii) each primary component is parsed into zero or more secondary components based on the following:
a) any subset of a primary component obtained by omitting one or more leading or trailing characters is a secondary component; and
b) the number of secondary components for a given primary component is a predetermined function of the primary component;

said data processor further configured to calculate a relevance score for each component of each said stored part number as follows:

assigning a weight factor WFa having a first predetermined value for alphabetic characters and a weight factor WFn having a second predetermined value for numeric characters in said part number, wherein the second predetermined value is higher than the first predetermined value;

calculating the weight WPC of each primary component by multiplying the number of characters in the primary component by WFa if the primary component contains alphabetic characters and by WFn if the primary component contains numeric component;

calculating the sum of the weights WPC of the primary components SUM(WPCi) in said part number;

calculating the weight of each character WEC by dividing a predetermined constant by SUM(WPCi);

calculating the relevance score for each numeric primary component by multiplying the number of primary component characters times WFn times WEC;

calculating the relevance score for each alphabetic primary component by multiplying the number of primary component characters times WFa times WEC; and for each secondary component of each primary component in said part number, calculating the relevance score as equal to the number of letters or numbers in the secondary component divided by the number of letters or numbers in the parent primary component times the relevance score of said parent primary component times a predetermined weighting factor, wherein the predetermined weighting factor for secondary components formed by omitting trailing characters in its parent primary component is a higher number than the weighting factor for secondary components formed by omitting leading characters in its parent primary component;

said data processor further configured to store each said relevance score in said digital memory;

a user interface for enabling a user to input a query part number, said user interface configured to parse said query part number into one or more query primary components and query secondary components based on said predetermined set of rules and to calculate a relevance score for each query component of said query part number as follows:

assigning a weight factor WFa having a first predetermined value for alphabetic characters and a weight factor WFn having a second predetermined value for numeric characters in said part number, wherein the second predetermined value is higher than the first predetermined value;

calculating the weight WPC of each primary component by multiplying the number of characters in the primary component by WFa if the primary component contains alphabetic characters and by WFn if the primary component contains numeric component;

calculating the sum of the weights WPC of the primary components SUM(WPCi) in said part number;

calculating the weight of each character WEC by dividing a predetermined constant by SUM(WPCi);

calculating the relevance score for each numeric primary component by multiplying the number of primary component characters times WFn times WEC;

calculating the relevance score for each alphabetic primary component by multiplying the number of primary component characters times WFa times WEC; and for each secondary component of each primary component in said part number, calculating the relevance score as equal to the number of letters or numbers in the secondary component divided by the number of letters or numbers in the parent primary component times the relevance score of said parent primary component times a predetermined weighting factor, wherein the predetermined weighting factor for secondary components formed by omitting trailing characters in its parent primary component is a higher number than the weighting factor for secondary components formed by omitting leading characters in its parent primary component;

said user interface further configured to store each said relevance score in said digital memory;

said data processor further configured to identify each stored part number that has at least one component that matches a stored query component of said query part number; and said user interface further configured for enabling the displaying to the user of the one or more identified stored part numbers in descending numerical order as a function of a first sum equal to the sum of the relevance scores of the one or more query components of the query part number that match a component of the identified stored part number; for enabling the display to the user of the one or more stored part numbers in descending numerical order as a function of a second sum equal to the sum of the relevance scores of the one or more components of the identified stored part number that match a query component for any identified stored part numbers whose first sums are the same; and for enabling the display to the user of the one or more stored part numbers in descending numerical order as a function of a third sum equal to the number of components in the identified stored part number that match components in said query part number for any identified stored part numbers whose first and second sums are the same.

13. The system of claim 12, wherein said user interface is coupled to a user accessible client computer through a computer network, and wherein said data processor comprises one or more computer servers.

14. The system of claim 12, wherein said digital memory comprises a first digital memory for storing said part numbers database and a second digital memory for storing said primary and secondary components of said stored part numbers and their respective relevance scores.

15. The system of claim 12, wherein said user interface and said data processor comprise a single computer.

16. The system of claim 12, wherein said data processor is further configured to parse each stored part number into one or more composite components, each composite component comprising the merging of two adjacent primary components, wherein said user interface is further configured to parse each query part number into one or more composite components, each composite component comprising the merging of two adjacent primary components, and wherein said wherein the relevance score for each composite component is equal to the sum of the relevance scores of the primary components in the composite component.

17. The system of claim 12, wherein said data processor is further configured to:

assign a component position number to each primary component of said query part number and to each primary component of each said stored part number, said component position number corresponding to the position of the component within the respective part number, assign the same component position number to each secondary component of a given primary component, and assign to each composite component the smaller of the two component position numbers assigned to the primary components that make up the respective composite component, and storing said component position numbers in a digital memory;

said user interface further configured to enable the display to the user of the one or more stored part numbers in ascending numerical order as a function of a fourth sum equal to the sum of the absolute values of the difference between the component position number of a query component and the component position number of a matched component of said identified stored part number for each matched component for any identified stored part numbers whose first and second sums are the same.

* * * * *